United States Patent [19]

Walkenhorst

[11] 4,124,656
[45] Nov. 7, 1978

[54] PROCESS FOR THE BULK POLYMERIZATION OF ALKENYLAROMATIC COMPOUNDS

[75] Inventor: Wilfried Walkenhorst, Liederbach, Fed. Rep. of Germany

[73] Assignee: Hoechst Aktiengesellschaft, Frankfurt (Main), Fed. Rep. of Germany

[21] Appl. No.: 807,320

[22] Filed: Jun. 16, 1977

[30] Foreign Application Priority Data

Jun. 18, 1976 [DE] Fed. Rep. of Germany ....... 2627336

[51] Int. Cl.² .................. C08F 253/00; C08F 255/06; C08F 279/02; C08F 12/08
[52] U.S. Cl. ............................. 260/878 R; 260/4 AR; 260/880 R; 260/886; 526/61; 526/308; 526/346
[58] Field of Search ............ 260/4 AR, 878 R, 880 R, 260/886; 526/61

[56] References Cited

U.S. PATENT DOCUMENTS

| | | | |
|---|---|---|---|
| 3,172,880 | 3/1965 | Lupfer | 526/61 |
| 3,254,071 | 5/1966 | Morgan et al. | 526/61 |
| 3,257,362 | 6/1966 | Norwood | 526/61 |
| 3,257,375 | 6/1966 | Norwood | 526/61 |
| 3,679,651 | 7/1972 | Kii et al. | 526/346 |
| 4,012,573 | 3/1977 | Trieschmann et al. | 526/61 |
| 4,042,768 | 8/1977 | Muller et al. | 526/88 |

FOREIGN PATENT DOCUMENTS 286,230  1/1971  U.S.S.R. .................... 526/61

Primary Examiner—Alan Holler
Attorney, Agent, or Firm—Curtis, Morris & Safford

[57] ABSTRACT

There is described a process for the homopolymerization or copolymerization in the bulk of alkenylaromatic compounds in a continuous flow agitation vessel. The feed of the monomer(s) is preheated and a controlled larger or smaller part of the preheated monomer feed is cooled, depending on the deviation of the temperature of the contents of the reaction vessel from the determined value. The inventive process ensures an improved constancy of the reaction temperature, and, consequently, of the molecular weight of the polymer obtained.

13 Claims, 9 Drawing Figures

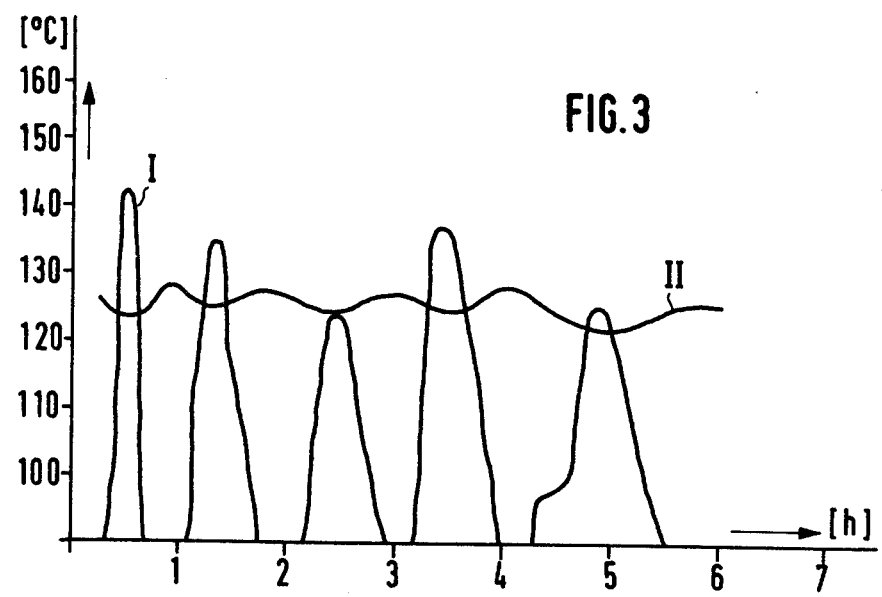
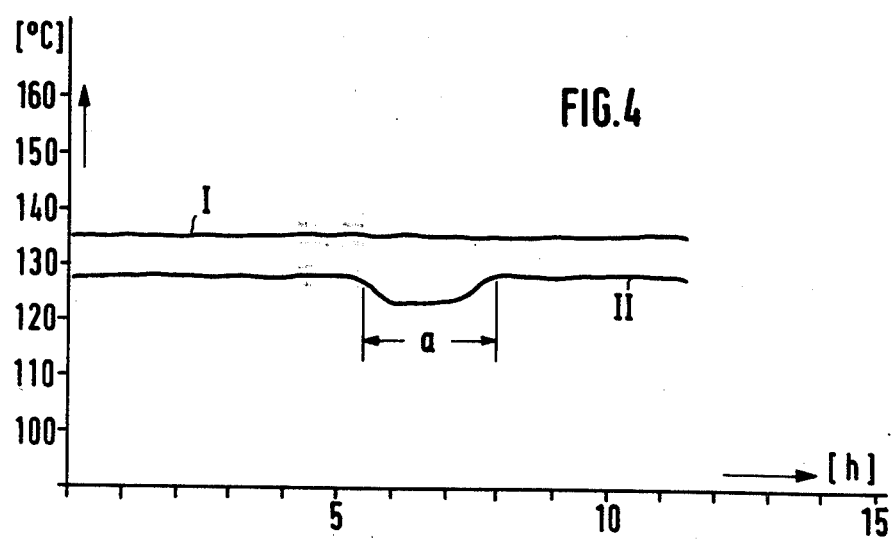

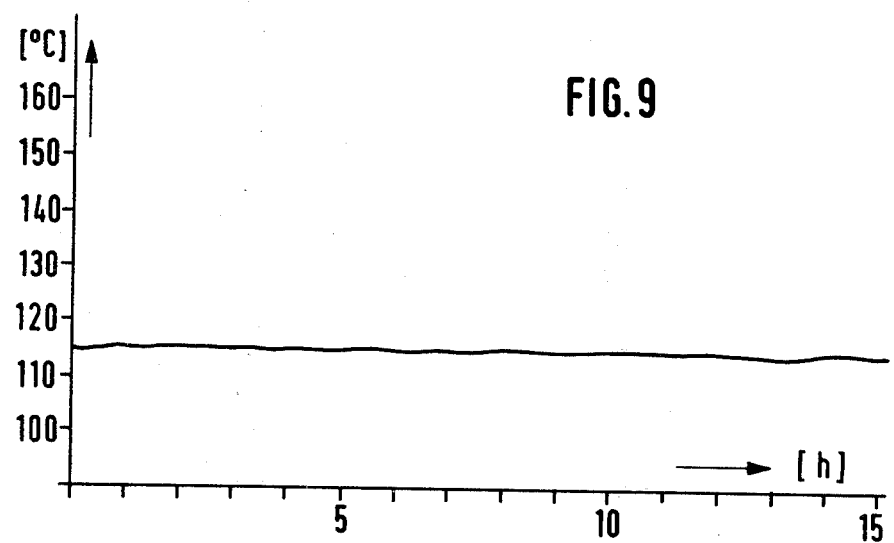

PROCESS FOR THE BULK POLYMERIZATION OF ALKENYLAROMATIC COMPOUNDS

Industrial-scale polymerization of styrene and the derivatives thereof may be carried out in bulk in continuous flow agitation vessels. This polymerization in bulk is in many cases carried out as so-called prepolymerization, that is, as the first step of multi-step continuous processes. Maintaining a definite bulk polymerization temperature is important for the mechanical properties of the polymers obtained. Since polymerization of styrene proceeds as a heavily exothermal reaction, the required constant temperature, according to the state of the art, can be maintained only incompletely and with a great difficulty.

According to the state of the art, the temperature is controlled by heating or cooling the jacket of the vessel. However, this kind of heat control is very sluggish, so that practically a temperature of the contents of the vessel is attained which is either below or above the required value by several degrees kelvins. Moreover, the larger the apparatus, the more unfavorable the ratio of contents to jacket area of the vessel, so that temperature control on an industrial scale is a real problem. A further disadvantage resides in the fact that, because of the sluggish heat transfer from the walls of the vessel to its contents, high jacket temperatures are required in order to heat the batch, which temperatures promote the formation of deposits, so that the degree of heat transfer is further decreased. In addition, abrasion of such deposits promotes formation of fish eyes.

Although the polymerization of styrene is an exothermal reaction which is self-supporting, the vessel has to be heated from the outside in order to compensate for heat losses.

Dissipation of reaction heat by reflux cooling is also known to those skilled in the art. However, temperature control in this case requires modification of the pressure in the interior of the vessel. Such pressure control increases costs and is unreliable, because the control valves are easily blocked by foaming polymer.

It is also known to those skilled in the art that the temperature may be controlled by correspondingly heating or cooling the monomer feed in a heat exchanger. However, this is no solution of the problem; for it is simply transferring the difficulties caused by the sluggish heating of the vessel from the jacket to the heat exchanger.

It is therefore the object of the present invention to maintain substantially constant the temperature in the vessel during the polymerization in bulk of alkenylaromatic compounds.

In accordance with this invention, there has been found a process for the bulk polymerization of alkenylaromatic compounds in a continuous flow agitation vessel provided with openings for the feed of the monomer(s) and the discharge of the polymer and with a thermocouple, the monomer(s) being preheated before entering the vessel, which comprises, depending on the variation of the polymerization temperature adjusted as intended, either feeding the preheated monomer(s) directly to the vessel, or passing it (them) partially or completely through a heat exchanger before introducing it (them) into the vessel.

Suitable alkenylaromatic compounds polymerizable according to the process of the invention are for example: styrene, α-methylstyrene, styrenes alkylsubstituted at the benzene nucleus such as o-, m- or p-vinyltoluene, the various isomeric vinylxylenes, o-, m- or p-ethylvinylbenzene, styrenes halogenated at the benzene nucleus such as o-, m- or p-chlorovinylbenzene or -bromovinylbenzene, and corresponding compounds the benzene nucleus of which is hydrogenated, such as vinylcyclohexane, 1-methyl-2-vinylcyclohexane, 1-methyl-3-vinylcyclohexane, 1-methyl-4-vinylcyclohexane etc. Alternatively, mixtures of the cited compounds may be copolymerized, or mixtures of at least one cited compounds with a nitrile of alkyl ester of acrylic acid or methacrylic acid and/or a natural or synthetic rubber, for example polybutadiene, polyisoprene, butadiene/styrene rubber, ethylene/propylene/diene (conjugated or not) rubber, the diene being for example hexadiene-1,4, dicyclopentadiene, or a 5-alkylidene-norbornene-2 such as 5-ethylidene-norbornene-2.

Preferably, styrene or mixtures of styrene and acrylonitrile and/or of the above rubbers are polymerized.

The polymerization is initiated either thermally or by know initiators which supply free radicals on decomposition, for example peroxides, such as benzoylperoxide and the derivatives thereof, lauroylperoxide, or azo compounds such as azodiisobutyronitrile.

The initiators are advantageously dosed by dissolving them in the monomer or monomer mixture.

Known regulators for adjusting the molecular weight, for example mercaptans, may be added to the monomer(s), furthermore plasticizers, for example white oils, antioxidants and UV stabilizers for rubbers, inert diluents such as aromatic hydrocarbons, for example ethylbenzene, toluene, xylenes.

The polymerization temperature is from about 100° to 140° C., preferably from about 120° to about 137° C. in the case of thermal initiation, and from about 50° to about 100° C., preferably from about 60° to about 80° C. when radical-forming agents are used as initiators.

The process of the invention is carried out for example in the following manner: the monomer or monomer mixture preheated (possibly by means of a flow heater) is either fed directly to the agitation vessel via a three-way valve, or previously to its introduction into the vessel, it is passed partially or completely through a heat exchanger, so that is is cooled again.

Depending on the variation of the polymerization temperature set, the three-way valve is controlled by means of the thermocouple in the agitation vessel.

FIGS. 3 and 4 show plots of coolant temperature and reactor temperature vs. time.

FIGS. 5, 6, 7, 8 and 9 show plots of reactor temperature vs. time.

Figure 1:
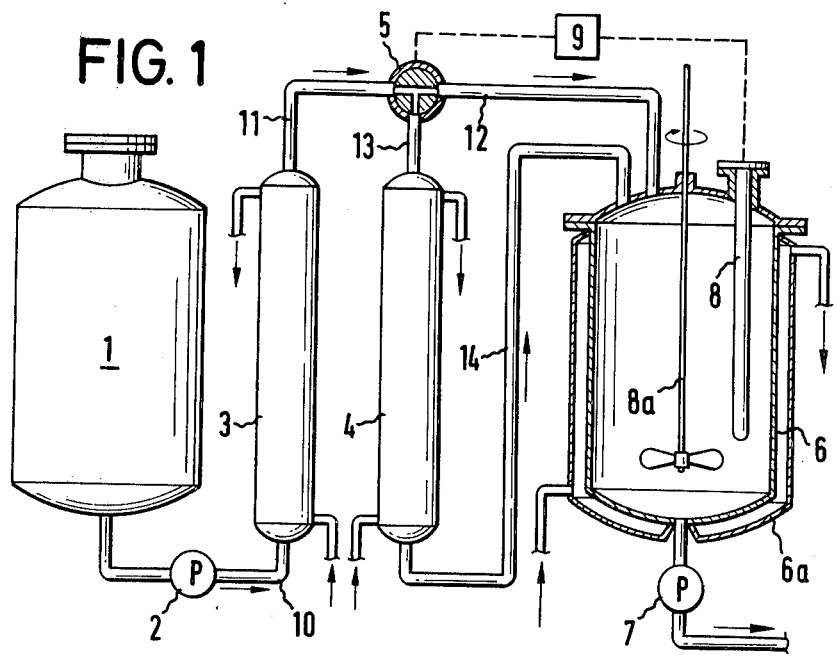
FIGS. 1 and 2 are schematic views of apparatus suitable for carrying out the process of the invention.

FIG. 1 of the accompanying drawings represents a schematic view of an apparatus which is suitable for carrying out the process of the invention, showing 1 reservoir for the monomer(s) or the solution of rubber in the monomer(s)
2 proportioning pump
3 heat exchanger (flow heater)
4 heat exchanger (cooler)
5 three-way control valve
6 polymerization vessel
6a heating jacket
7 discharging pump
8 thermocouple
8a agitator
9 control device 10 connection tube from proportioning pump 2 to heat exchanger 3

11 connection tube from heat exchanger 3 to three-way valve 5

12 connection tube from three-way valve 5 to polymerization vessel 6

13 connection tube from three-way valve 5 to heat exchanger 4

14 connection tube from heat exchanger 4 to polymerization vessel 6.

The monomer is taken from reservoir 1 and forwarded via proportioning pump 2 and tube 10, flow heater 3 where it is preheated, tube 11, three-way valve 5 and tube 12 to polymerization vessel 6; or, partially or completely, after having passed tube 11, forwarded via three-way valve 5, tube 13, cooler 4 where it is cooled again, and tube 14 to polymerization vessel 6; three-way control valve 5 being controlled by means of thermocouple 8 in agitation vessel 6 and control device 9 depending on the variation of the polymerization temperature set.

Figure 2:
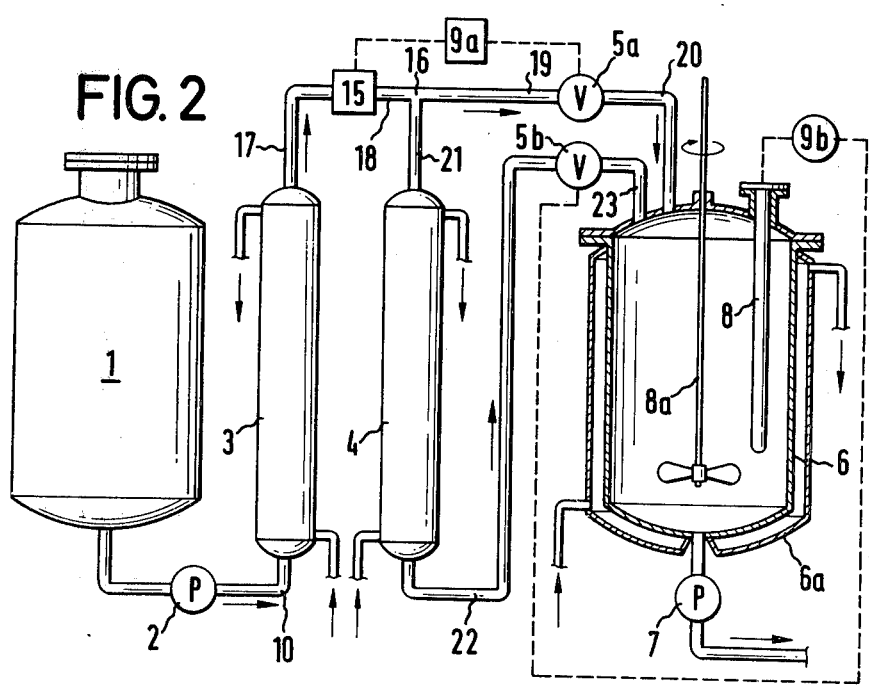

FIG. 2 of the accompanying drawings represents a schematic view of another apparatus suitable for carrying out the process of the invention, showing 5a control valve
5b control valve
9a control device
9b control device
15 orifice plate (restrictor, flow meter cell)
16 manifold (branching of the tubes)
17 connection tube from heat exchanger 3 to orifice plate 15
18 connection tube from orifice plate 15 to manifold 16
19 connection tube from manifold 16 to control valve 5a
20 connection tube from control valve 5a to polymerization vessel 6
21 connection tube from manifold 16 to heat exchanger 4
22 connection tube from heat exchanger 4 to control valve 5b
23 connection tube from control valve 5b to polymerization vessel 6.

1, 2, 3, 4, 6, 6a, 7, 8, 8a and 10 are as defined for FIG. 1.

Proportioning pump (feed pump) 2 pumps the cold monomer or monomer mixture or solution of rubber in the monomer under constant pressure from reservoir 1 via connection tube 10 to heat exchanger 3 (heated for example with high pressure steam). Depending on the heat supply and the flow rate, the monomers leave heat exchanger 3 having a temperature of from about 60° to about 105° C. and are forwarded through connection tube 17, orifice plate 15 which controls control valve 5a by means of control device 9a, connection tube 18, manifold 16, connection tube 19, control valve 5a and connection tube 20 to polymerization vessel 6. By opening or closing control valve 5a, orifice plate 15 keeps the determined feed of monomers constant. Control valve 5b being tightly closed, the total amount of preheated monomers is fed to polymerization vessel 6 the temperature of the walls of which is adjusted to about 110° to about 140° C. by means of a usual pressurized water heater. An amount of material which corresponds to the monomer feed to polymerization vessel 6 is continuously discharged by means of pump 7. The temperature in vesel 6 is measured by means of thermocouple 8 which controls control valve 5b via control device 9b. When the temperature of the contents of the vessel exceeds the determined value, control valve 5b is open partially or entirely, so that cold monomers are fed to vessel 6 via connection tube 21, cooler 4 where they are cooled to, for example, 20° C., connection tube 22, valve 5b and connection tube 23.

By additionally opening control valve 5b, the total monomer amount fed in (via valves 5a and 5b) increases for a very short time. This increase is recorded by orifice plate 15 which closes valve 5a via control device 9a to such an extent that the total monomer amount fed to vessel 6 is maintained constant. In special cases, valve 5a is entirely closed.

In the case where the temperature in vessel 6 is not sufficiently high, valve 5b, controlled by thermocouple 8 via control device 9b, is throttled. Simultaneously, orifice plate 15, by opening valve 5a via control device 9a, maintains constant the total monomer amount fed in on the one hand, and on the other increases the feed of preheated monomer.

The arrangement of flow heater 3 and cooler 4 safely prevents blocking of heat exchanger 3 by polystyrene produced by the starting thermal polymerization reaction. The process of the invention ensures the temperature in the polymerization vessel to be constant; the deviation from the determined value being only ± 1 kelvin only.

The process of the invention is suitable above all for the first step of a two- or multi-step polymerization of alkenylaromatic compounds. Since the viscosity increases rapidly when the polymer content in the monomer(s) exceeds a certain limit, it is advantageous to apply the process of the invention, in the case of homopolymerization of alkenylaromatic compounds, up to a polymer content of a maximum of 70%, preferably 55%, and in cases of copolymerization with nitriles or esters of (meth)acrylic acid or copolymerization in the presence of a rubber, up to a polymer content of a maximum of 45%, preferably 20 to 30%, and to forward subsequently the mixture discharged from the polymerization vessel, that is, the so-called prepolymer, to one or more further polymerization step(s), for example a bulk polymerization with relfux cooling or a suspension polymerization.

The following examples illustrate the invention.

EXAMPLE 1

In a continuous flow agitation vessel having a capacity of 120 l, a 6% solution of a commercial butadiene rubber having a content of less than 20% of cis-structure units (Mooney viscosity $ML_4 = 40$) is styrene was polymerized thermally in bulk at 130° C.

The throughout was 80 l/h, that is, 80 l/h of the styrene/rubber solution were continuously fed to the polymerization vessel and simultaneously 80 l/h of polymer, dissolved in the unreacted monomer, were removed. The polymerization vessel contained a constant 100 liter batch. The mean residence time was 75 minutes.

(a) COMPARATIVE EXAMPLE

In the accordance with the state of the art, the temperature of the contents of the vessel was controlled by means of a pressurized water cycle in the jacket; the styrene/rubber solution fed in was preheated to 85° C.

As shown in the diagram of FIG. 3 of the accompanying drawings, the temperature of the contents of the vessel deviated from the determined value of ±4 kelvins. The relatively great sluggishness of the control system and the dependence of the polymerization heat from the temperature attained caused the temperature/time diagram to show sinusoidal undulations. The temperature variations resulted furthermore in variations of the polymer content in the batch of from 24 to 28%.

In the diagram of FIG. 3, I stands for the temperature in the jackets and II for that of the contents of the vessel.

(b) EXAMPLE ACCORDING TO THE INVENTION

When the process of the invention was carried out using an apparatus as shown in FIG. 2, a constant temperature of 135° C. was maintained in the jacket of the polymerization vessel by means of pressurized water.

The corresponding temperature/time diagram is shown in FIG. 4 of the accompanying drawings (I and II being as defined for FIG. 3), and it demonstrates that the temperature of the contents of the vessel was maintained at ± 1 kelvin of deviation only when operating in accordance with this invention.

Time section $a$ represents a decrease of temperature of the contents in the vessel by reduction of the determined value by 4 kelvins. This altered temperature level was attained within a short time, and the former state was restored just as rapidly.

According to the high degree of temperature constancy attained in the batch, the variations of polymer content were 35 0.5% at both temperatures.

EXAMPLE 2

Figure 5:
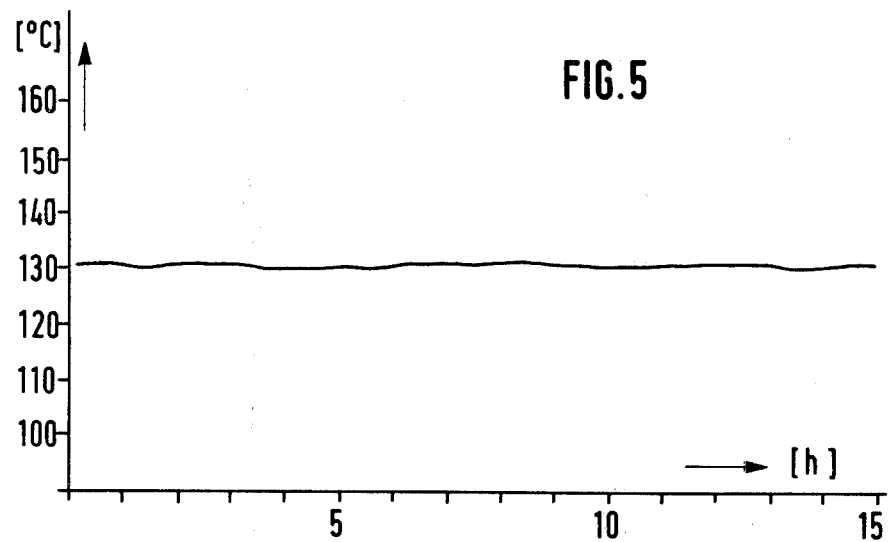

In an apparatus according to FIG. 2, a mixture of 91 parts by weight of styrene, 3 parts by weight of white oil (mixture of paraffinic hydrocarbons having a boiling range of from 241° to 328° C. at 10 mm Hg) and 6 parts by weight of the rubber used in Example 1 were polymerized as described in Example 1 at a constant throughput of 80 l/h (mean residence time in the vessel 75 minutes). By means of pressurized water, a constant temperature of 130° C. was maintained in the jacket of the vessel. The styrene solution was preheated to 85° C. by heat exchanger 3, and a more or less large partial stream (depending on a corresponding control of valve 5b) was cooled to about 20° C. FIG. 5 of the accompanying drawings shows the slight deviation of ± 1 kelvin from the required value of 135° C. The polymer content of the polymer solution in unreacted styrene discharged from the vessel was 25 ± 0.5%.

EXAMPLE 3

A mixture of 89 parts by weight of styrene, 3 parts by weight of the white oil used in Example 2 and 8 parts by weight of the rubber used in Example 1 were polymerized according to Example 1b. The throuput was 40 l/h, the contents of the vessel 80 l, the mean residence time in the vessel 2 hours. The jacket of the vessel was heated at 125° C., which was also the determined temperature of the contents of the vessel.

Figure 6:
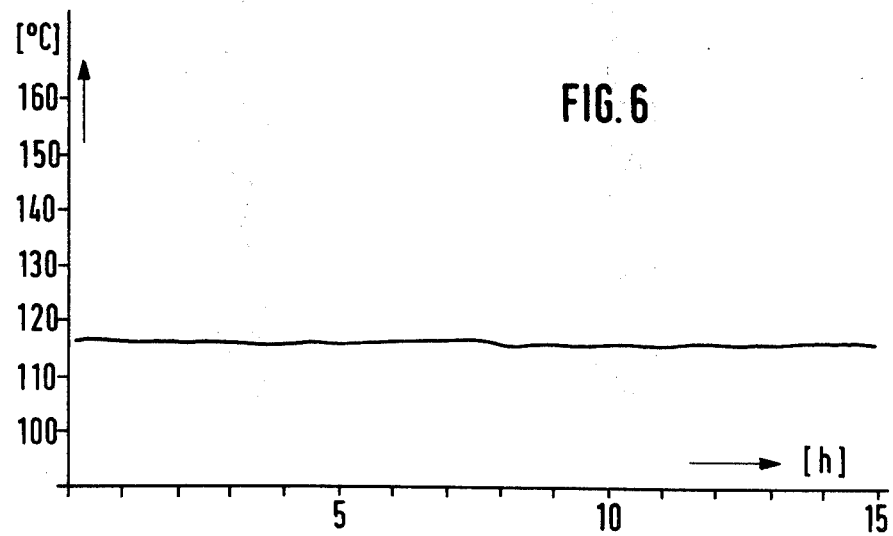

FIG. 6 of the accompanying drawings demonstrates the slight deviation from the determined temperature value of only ±1 kelvin for several hours. The polymer content of the solution discharged from the vessel was 22%.

EXAMPLE 4

A solution of 94 parts by weight of styrene and 6 parts by weight of a commercial butadiene rubber having a content of less than 20% of cis-structure units (Mooney viscosity $ML_4 = 50$) was polymerized as described in Example 1b. The throughput was 60 l/h, the constant contents of the vessel 60 l, the mean residence time in vessel 60 minutes and the temperature of the jacket was 130° C.

Figure 7:
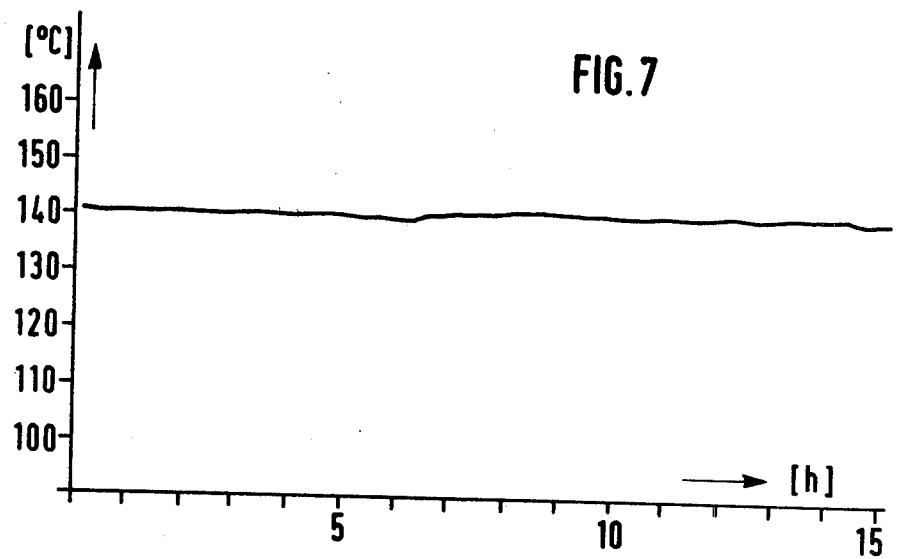

As results from FIG. 7 of the accompanying drawings, the determined temperature value of 140° C. of the contents of the vessel was maintained at a deviation of ± 1 kelvin. The polymer content of the discharged solution was 31%.

EXAMPLE 5

A solution of 94% by weight of styrene and 6 parts by weight of the rubber used in Example 1 was polymerized as described in Example 1b. The throughput was 80 l/h, the constant contents of the vessel 100 l, the mean residence time in the vessel 75 minutes. The temperature of the contents of the vessel was first adjusted to 130° C., subsequently decreased to 120° C. and finally raised again to 130° C.

Figure 8:
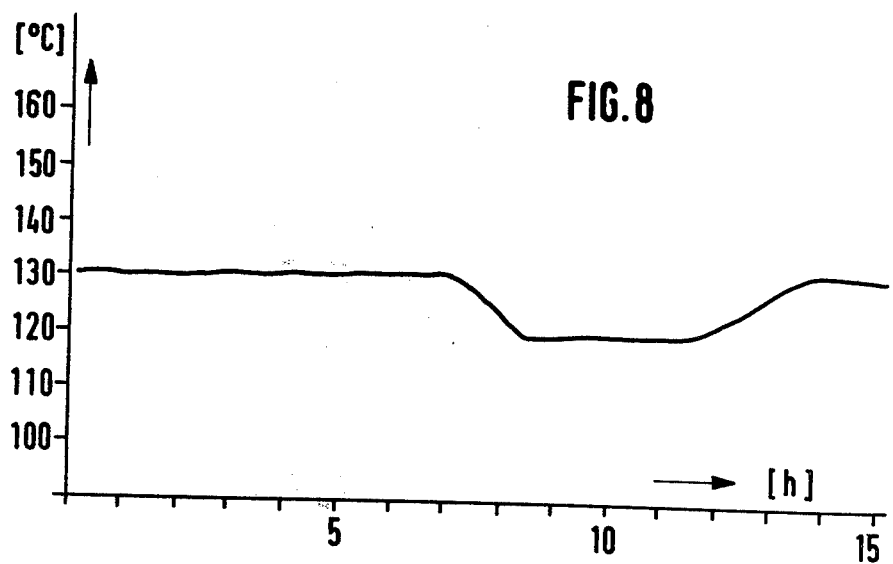

FIG. 8 of the accompanying drawings demonstrates that the determined temperature values were exactly maintained at a deviation of ± 1 kelvin.

EXAMPLE 6

As described in Example 1b styrene was polymerized. The throughput was 20 l/h, the constant of the vessel 120 l, the means residence time 6 hours, and the temperature of the jacket was constantly maintained at 120° C.

From FIG. 9 of the accompanying drawings results that the determined temperature value of the contents of the vessel was maintained with a deviation of only ± 1 kelvin. The polymer content of the discharged solution was 35 ± 0.5%.

What is claimed is:

1. A process for making polymers of alkenylaromatic and alkenylcycloaliphatic monomeric compounds in a heated agitated continuous polymerization vessel to which one or more monomers are continuously fed and from which a polymeric product is continuously withdrawn which comprises heating a first stream of feed monomer to an elevated temperature, dividing said heated first stream into a second and third stream, introducing said second stream into said vessel, cooling said third stream to a temperature below the desired polymerization temperature and thereafter introducing it into said vessel and regulating the relative flow rates of said second and third streams to maintain the polymerization temperature in said vessel substantially at a desired value.

2. The process as claimed in claim 1, which comprises polymerizing styrene as alkenylaromatic compound.

3. The process as claimed in claim 1, which comprises copolymerizing said monomeric compound with a nitrile or an ester of acrylic or methacrylic acid.

4. The process as claimed in claim 1, which comprises copolymerizing said monomeric compound, in the presence of a natural or synthetic rubber.

5. A process as claimed in claim 1, which comprises copolymerizing said monomeric compound, together with a nitrile or an ester of acrylic or methacrylic acid, in the presence of a natural or synthetic rubber.

6. The process as claimed in claim 4 wherein the rubber is an ethylene-propylene-diene rubber wherein the diene may or may not be conjugated.

7. The process as claimed in claim 6, wherein the rubber is an ethylene-propylene-5-ethylidene-norbornene-2 rubber.

8. The process as claimed in claim 1, which comprises carrying out the polymerization until a polymer content of up to 70% is reached.

9. The process as claimed in claim 1, which comprises carrying out the polymerization until a polymer content of up to 55% is reached.

10. The process as claimed in claim 3, which comprises carrying out the polymerization until a polymer content of up to 45% is reached.

11. The process as claimed in claim 3, which comprises carrying out the polymerization until a polymer content of 20 to 30% is reached.

12. A process according to claim 1 wherein the flow rate of said third stream is varied in response to the polymerization temperature in said vessel.

13. A process according to claim 12 wherein the flow rate of said second stream is varied inversely in respect to the flow rate of said third stream to maintain the flow rate of said first stream substantially constant.

* * * * *